United States Patent [19]

Briscoe

[11] Patent Number: 4,601,010

[45] Date of Patent: Jul. 15, 1986

[54] CONVERTER DEVICE FOR A COMPUTER TERMINAL

[76] Inventor: Robert J. Briscoe, 10 Cider Mill La., Upton, Mass. 01568

[21] Appl. No.: 562,712

[22] Filed: Dec. 19, 1983

[51] Int. Cl.[4] .......... G06F 1/00
[52] U.S. Cl. .......... 364/900
[58] Field of Search .......... 364/900 MS File

[56] References Cited

U.S. PATENT DOCUMENTS 4,424,572 1/1984 Lorig et al. .......... 364/900

*Primary Examiner*—Raulfe B. Zache
*Attorney, Agent, or Firm*—Irving M. Kriegsman

[57] ABSTRACT

A converter device which enables a computer terminal having text display capability only to be used for displaying either graphics or text and graphics simultaneously in addition to text is disclosed. The device connects in series between the video output port of the terminal electronics section of the computer terminal and the video input port of the CRT electronics section of the computer terminal and in parallel with the RS232 port of the computer terminal to an external source of serial data signals and includes a microprocessor controlled relay which allows either video signals generated by the control electronics section of the computer terminal or internally generated video signals to be transmitted to the CRT electronics section, a fail-safe switch which allows the computer terminal to function normally in the event of a malfunction in the device, a data processing system having a microprocessor, a character generator read-only memory and video refresh memory section containing random access memory elements for storing graphic data and random access memory elements for storing ASCII code signals representative of characters and selection circuitry for selecting which memory elements should be outputted at a particular instant in time.

11 Claims, 14 Drawing Figures

CONVERTER DEVICE FOR A COMPUTER TERMINAL

BACKGROUND OF THE INVENTION

The present invention relates generally to computer terminals and more particularly to a converter device for use with a computer terminal that is constructed to display text only which enables the computer terminal to display either graphics or graphics and text simultaneously as well as text.

Computer terminals which are constructed to display text are well known in the art. Computer terminals which are constructed to display graphics are also well known in the art. One of the shortcomings of a computer terminal constructed to display text is that it cannot be used to display graphics. One reason why a text type computer terminal cannot be used to display graphics is that the video refresh system in the terminal does not have the memory needed to store data signals corresponding to dot patterns of images.

As can be appreciated, in many instances a user having a computer terminal constructed to display text only may have a need to also display graphics on his terminal.

The present invention solves this problem by providing a converter device which can be connected to a text type display terminal and which when so connected will enable the computer terminal to be used for graphics.

It is an object of this invention to provide a device for enabling a computer terminal that is constructed to display only text to display either graphics or graphics and text simultaneously as well as text.

It is another object of this invention to provide a device as described above which is microprocessor controlled.

It is still another object of this invention to provide a device as described above which becomes passive when powered down or not functioning properly.

It is yet still another object of this invention to provide a device as described above which can work with a variety of different protocols.

It is a further object of this invention to provide a device as described above which is easy to install and easy to use.

SUMMARY OF THE INVENTION

A device for enabling a text type computer terminal to display graphics in addition to text, said computer terminal including a terminal electronics section having a data input port for receiving serial data signals from an external source and a video output port and a CRT electronics section having a video input port constructed according to the teachings of the present invention comprises a data input means for receiving serial data signals from an external source, a video input means for receiving video signals from the video output port of the terminal electronics section, a video output means for applying video signals to the video input port of the CRT electronics section, a data processing system coupled to the data input means for processing data signals corresponding at least to graphics and generating therefrom video signals representative of the dot pattern represented by said data signals, and means for applying either video signals from the video input means or video signals from the data processing system to the video output means.

The foregoing and other objects and advantages will appear from the description to follow. In the description, reference is made to the accompanying drawings which form a part thereof, and in which is shown by way of illustration, a specific embodiment for practicing the invention. This embodiment will be described in sufficient detail to enable those skilled in the art to practice the invention, and it is to be understood that other embodiments may be utilized and that structural changes may be made without departing from the scope of the invention. The following detailed description is, therefore, not to be taken in a limiting sense, and the scope of the present invention is best defined by the appended claims.

BRIEF DESCRIPTION OF THE DRAWINGS

In the drawings wherein like reference numerals represent like parts:

FIGS. 3, 4, and 5 are interconnected;

FIGS. 6, 7, and 8 are interconnected; and

FIGS. 9, 10 and 11 are interconnected.

DETAILED DESCRIPTION OF PREFERRED EMBODIMENT

Figure 1:
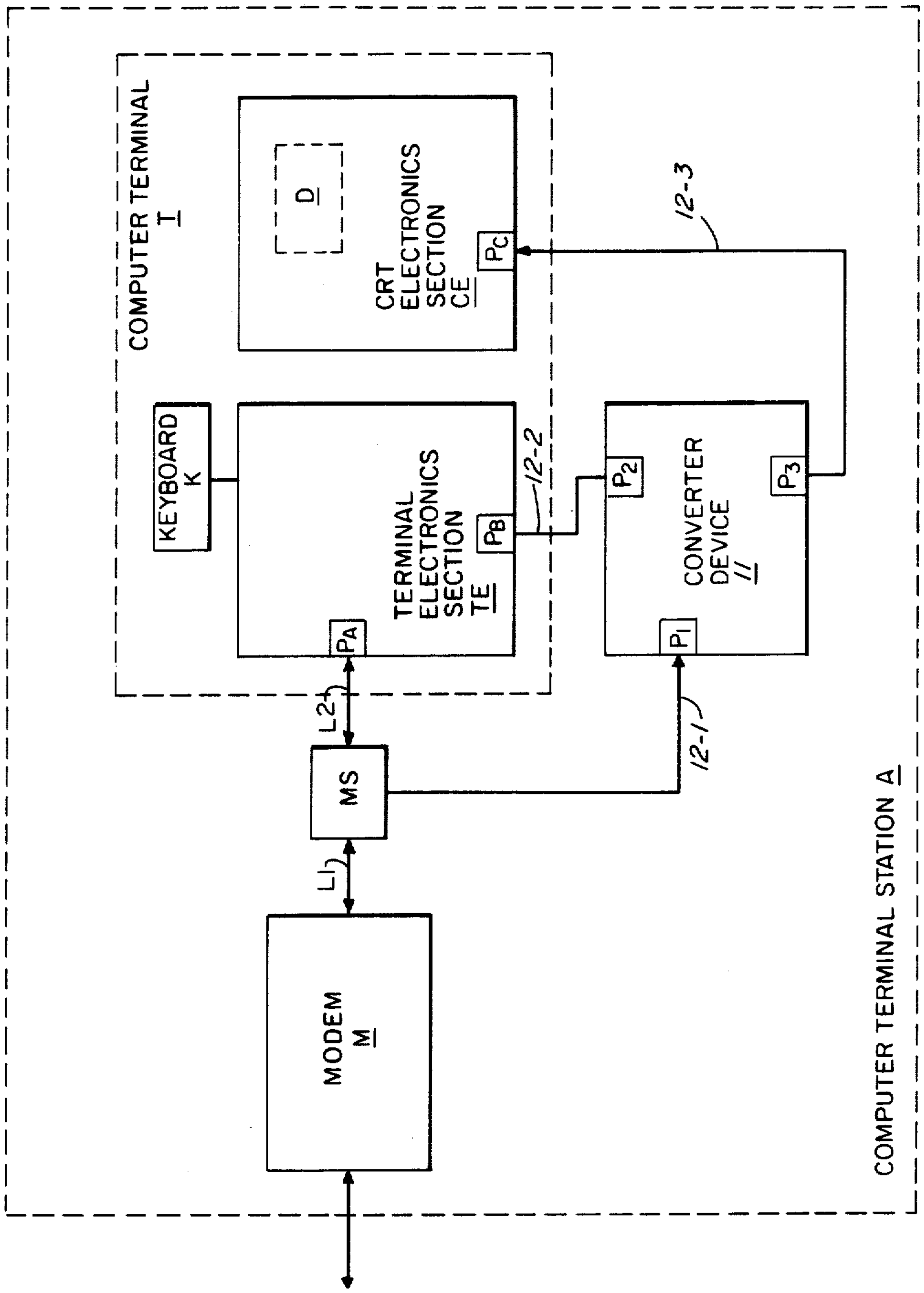
FIG. 1 is a block diagram of a computer terminal station the station including a converter device of the present invention, a computer terminal and a modem.

The present invention is directed to a converter device which enables a computer terminal having text display capability only to be used for displaying either graphics or text and graphics simultaneously in addition to text. The device connects in series between the video output port of the control electronics section and the video input port of the CRT electronics section of the computer terminal and in parallel with the RS232 port of the computer terminal to an external source of serial data signals.

The device includes a microprocessor controlled relay which allows either video signals generated by the control electronics section of the computer terminal or internally generated video signals to be transmitted to the CRT electronics section. The device also includes a fail-safe switch which allows the computer terminal to function normally in the event of a malfunction in the device. The device also includes a character generator read-only memory and video refresh memory section containing random access memory elements for storing graphic data and random access memory elements for storing ASCII code signals representative of characters. The device also include a novel arrangement for selecting which memory elements should be outputted at a particular instant in time.

Before describing, in detail, the particular device for enabling a computer terminal having text display capability only to display images in accordance with the present invention, it should be observed that the present invention resides primarily in a novel structural combination of conventional computer components and communication circuits, and not in the particular detailed configurations thereof. Accordingly, the structure, control, and arrangement of these conventional components and circuits have, for the most part, been illustrated in the drawings by readily understandable block representations and schematic diagrams, which show only those specific details that are pertinent to the present invention, in order not to obscure the disclosure with structural details which will be readily apparent to those skilled in the art having the benefit of the description herein. In addition, various portions of an electronic data processing system have been appropriately consolidated and simplified in order to emphasize those portions that are most pertinent to the present invention. Thus, the block diagram illustrations of the Figures do not necessarily represent the mechanical structural arrangement of the exemplary system, but are primarily intended to illustrate the major structural components of the system in a convenient functional grouping, whereby the present invention can be more readily understood.

Referring now to the drawings there is illustrated in FIG. 1 a block diagram of a computer terminal station A. Station A includes a computer terminal designated by the letter T. Computer terminal T includes a keyboard K, a terminal electronics section TE and a CRT electronics section CE. The terminal electronics section TE includes an RS232 port PA for use in connecting the computer terminal T to an external source of data signals and a video output port PB. CRT electronics section CE includes a video input port PC and a display screen D. Computer terminal T is a type of terminal that is capable of displaying text (i.e. processing data signals received from an external source representative of text and then displaying the characters represented thereby) but is not capable of displaying graphics (i.e. equipped to process data signals received from an external source representative of images and displaying the images represented thereby).

Also shown in FIG. 1 is a modem M and a device 11 constructed according to the teachings of the present invention, the device 11 enabling computer terminal T to be used for graphics or for text and graphics simultaneously as well as text. Modem M is adapted to receive serial data signals (over a line not shown) from an external source, such as a host computer (also not shown). Device 11 includes a first input port P1, a second input port P2 and an output port P3. First input port P1 is connected by a line 12-1 to a modem splitter MS. Modem splitter MS is connected through a line L1 to modem M and through line 12 to port PA of terminal electronics section TE. Second input port P2 is connected by a line 12-2 to the video output port PB of terminal electronics section TE. Output port P3 is connected by a line 12-3 to the video input port PC of CRT electronics section CE. In the operation of the apparatus, data signals from modem M representative of text are processed in terminal electronics section TE while data signals from modem M representative of images or text to be displayed simultaneously, with images are processed by device 11. In each instance the output signals are transmitted to CRT electronics section CE over line 12-3.

In the drawings illustrating the component parts of device 11, a number underlined indicates a reference numeral identifying a particular component while a number or combination of numbers and letters not underlined indicates the part or chip number of the particular component.

Figure 2:
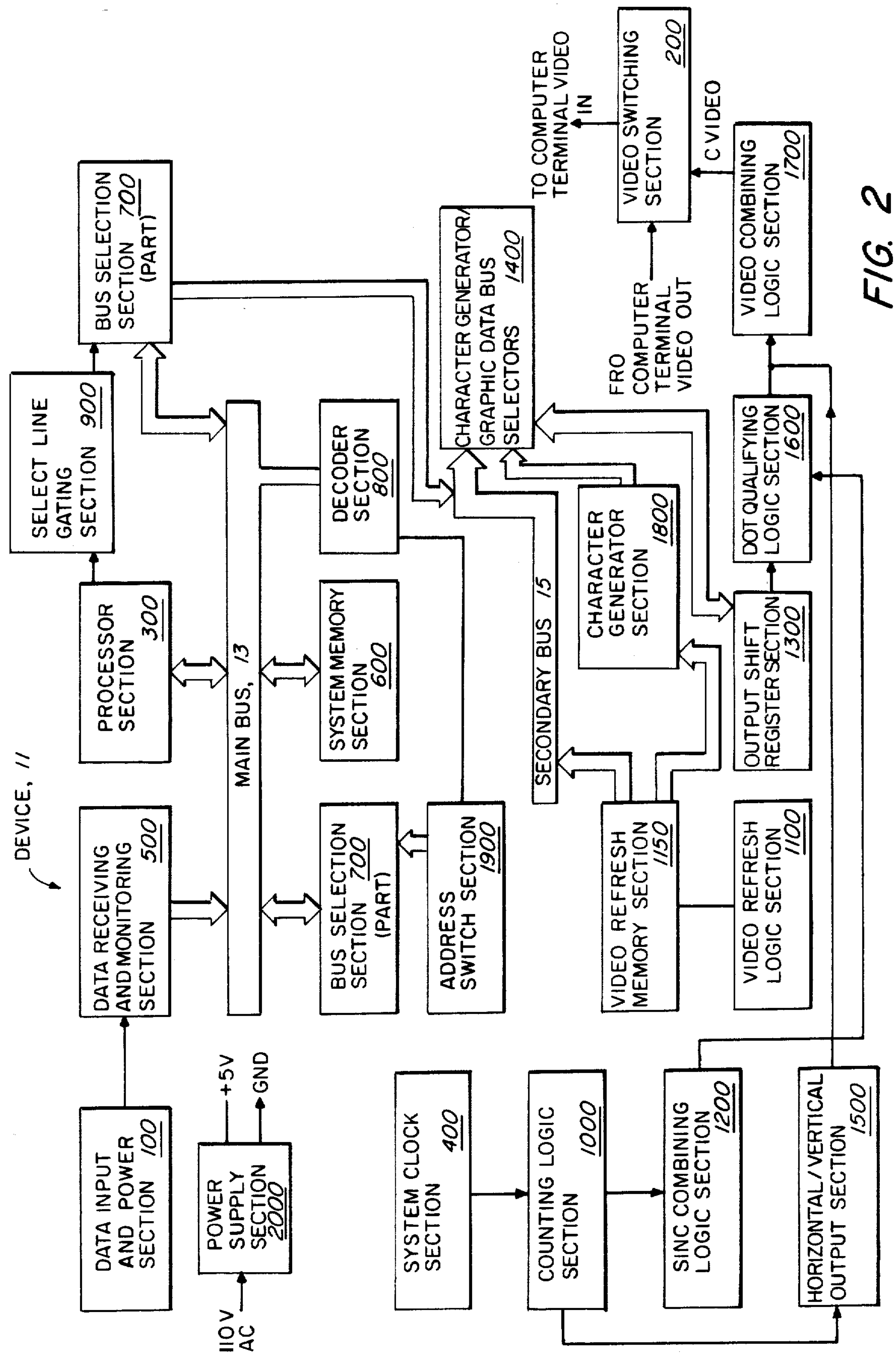
FIG. 2 is a generalized block diagram of the device shown in FIG. 1.
Figures 3, 4:
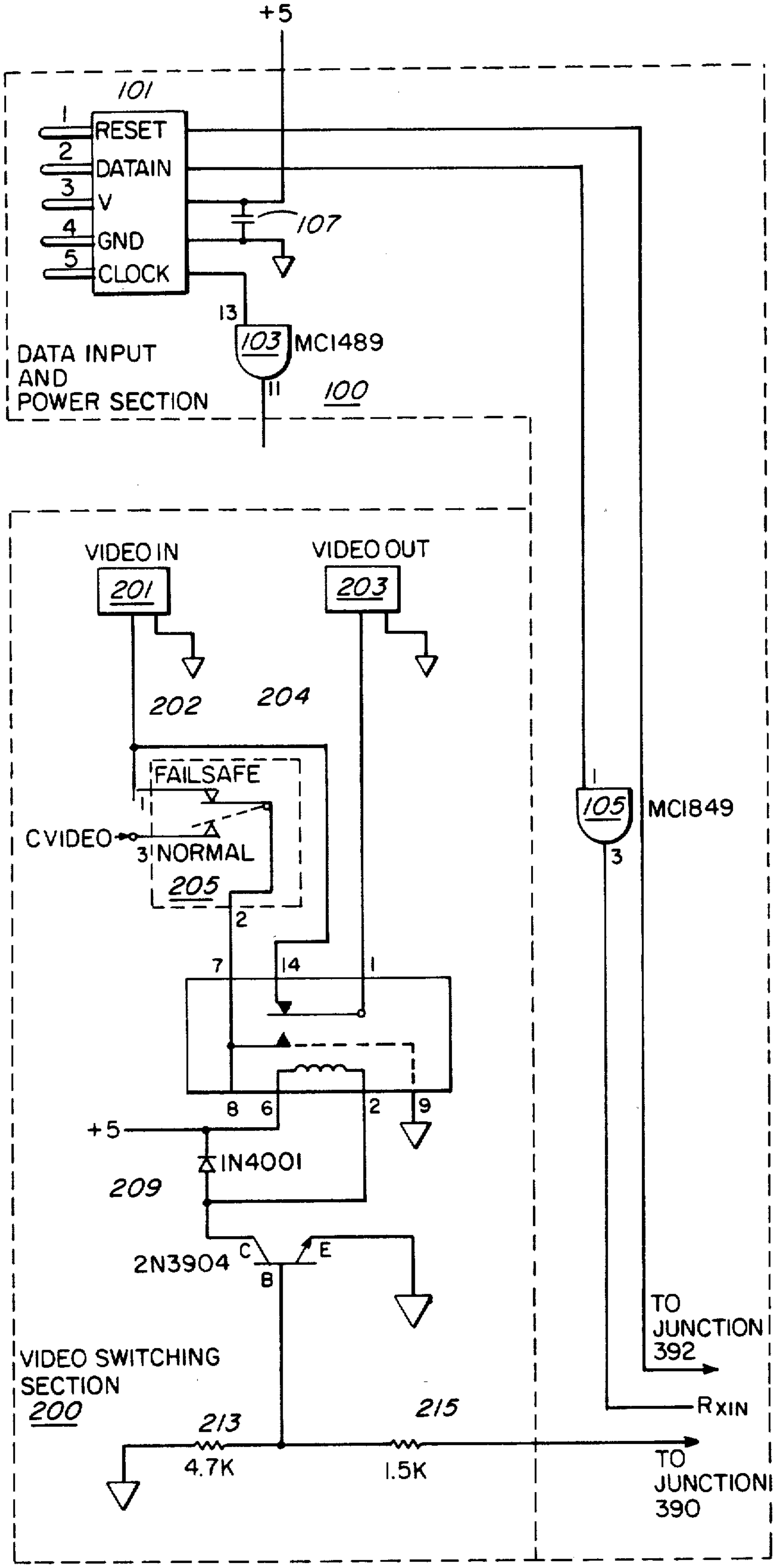
FIG. 3 is a schematic diagram of the data input and power section 100 shown in FIG. 2.
FIG. 4 is a schematic diagram of the video switching section 200 shown in FIG. 2.
Figure 5:
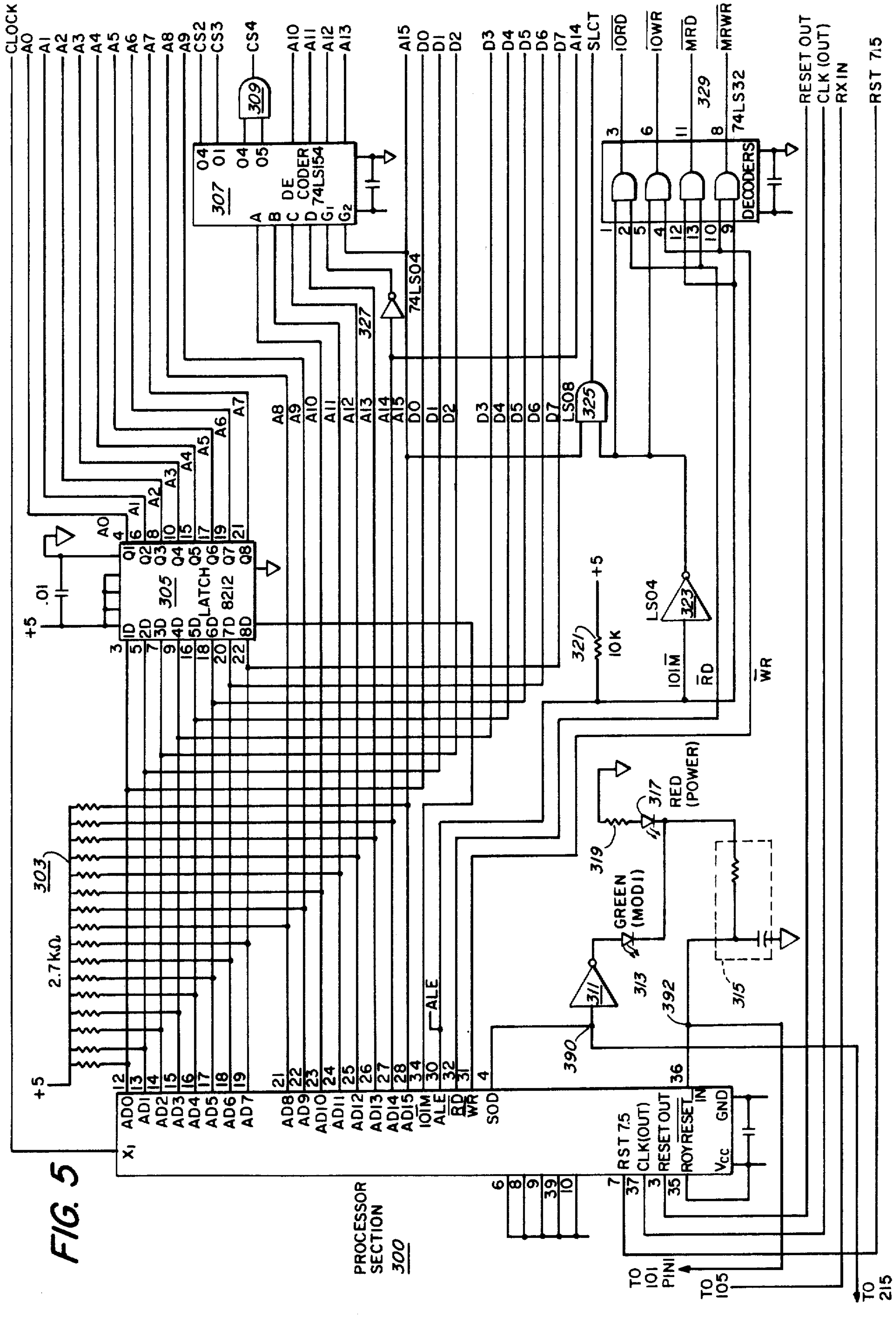
FIG. 5 is a schematic diagram of the processor section 300 shown in FIG. 2.
Figure 6:
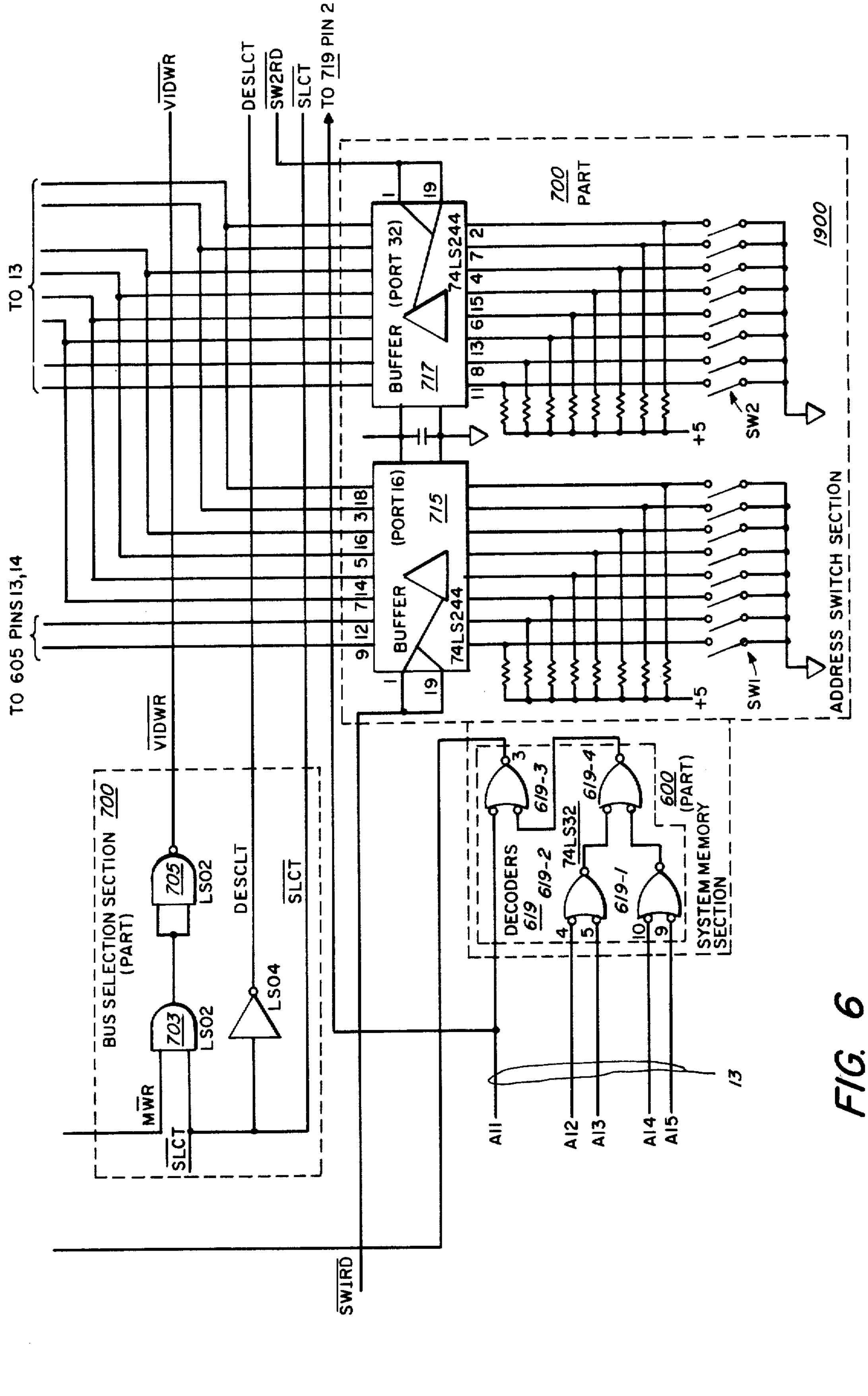
FIG. 6 is a schematic diagram of a part of the system memory section 600, a part of the bus selection section 700, and the address switch section 1900, shown in FIG. 2.
Figure 7:
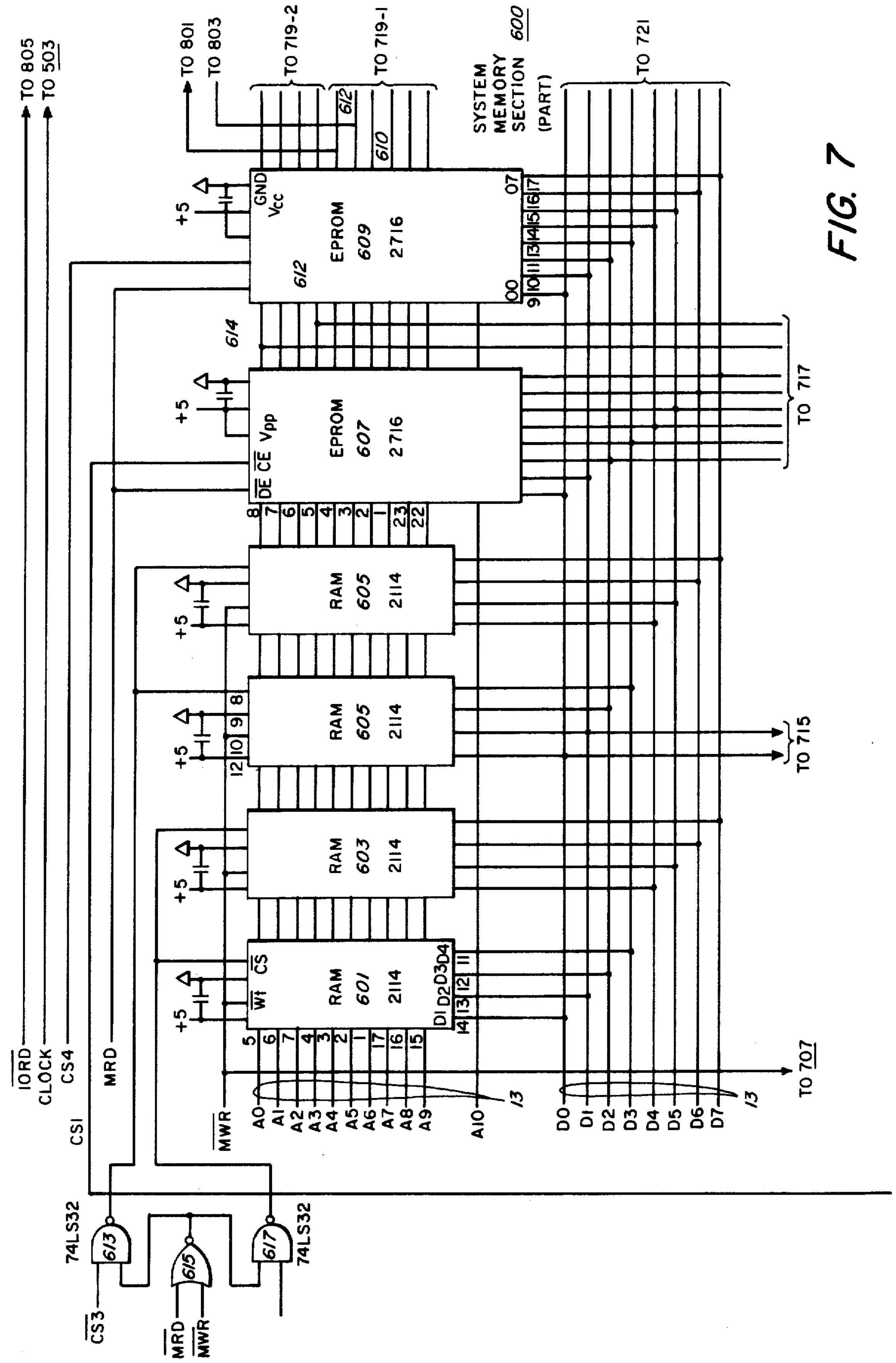
FIG. 7 is a schematic diagram of the other part of the system memory section 600, shown in FIG. 2.
Figure 8:
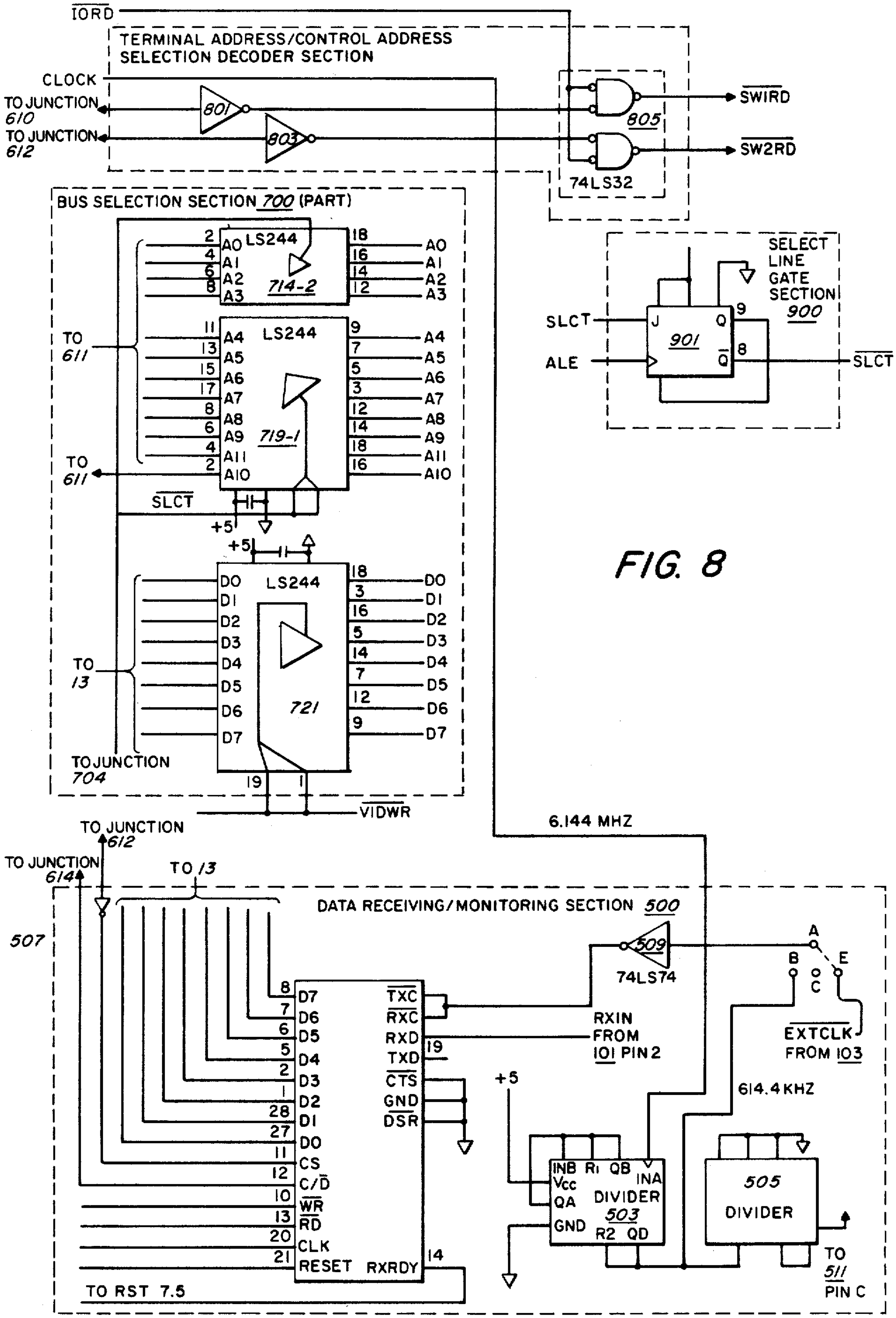
FIG. 8 is a schematic diagram of the data receiving and monitoring section 500, another part of the bus selection section 700, the terminal address and control address selection decoder section 800 and the select line gate section 900 shown in FIG. 2.
Figure 9:
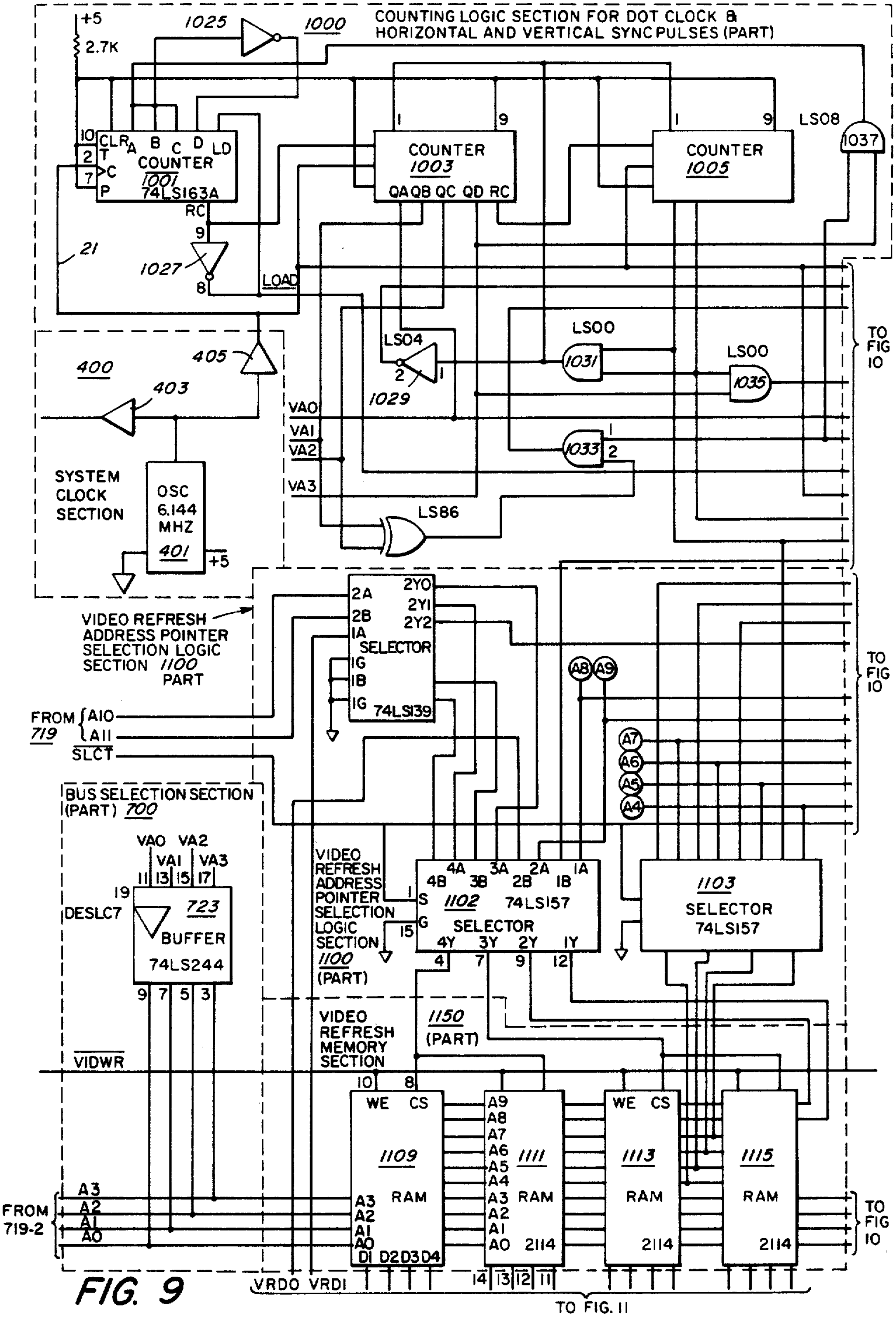
FIG. 9 is a schematic diagram of the system clock section 400, a part of the bus selection section 700, a part of the counting logic section 1000 for dot clock and horizontal and vertical sync pulses, a part of the video refresh address pointer selection logic section 1100, and a part of the video refresh memory section 1150 shown in FIG. 2.
Figure 10:
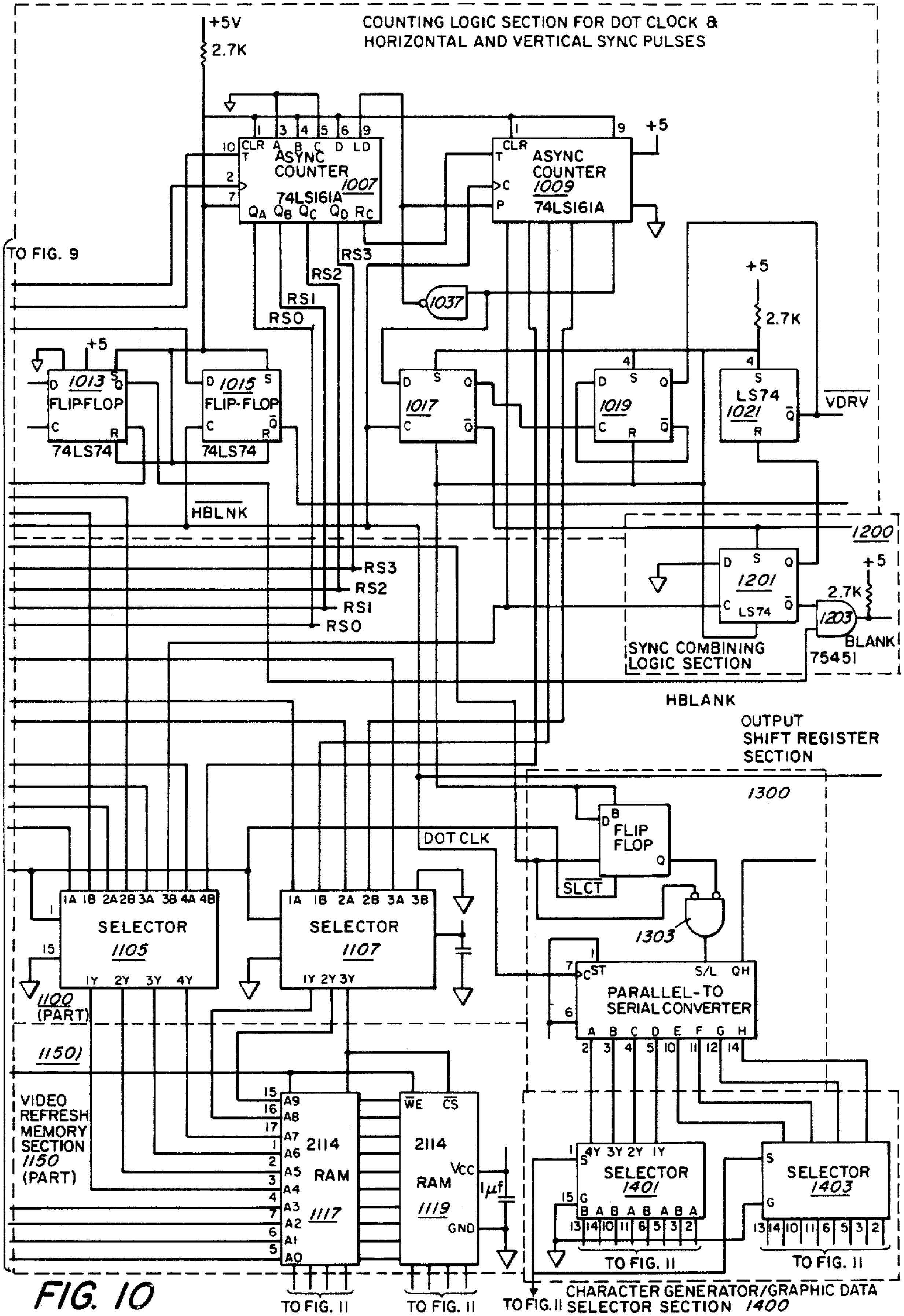
FIG. 10 is a schematic diagram of the other part of the counting logic section 1000 for dot clock and horizontal and vertical sync pulses, another part of the video refresh, address pointer selection logic section 1100, another part of the video refresh memory section 1150, the sync combining logic section 1200, the output shift register section 1300 and the character generator and graphic data bus selection section 1400, shown in FIG. 3.
Figure 11:
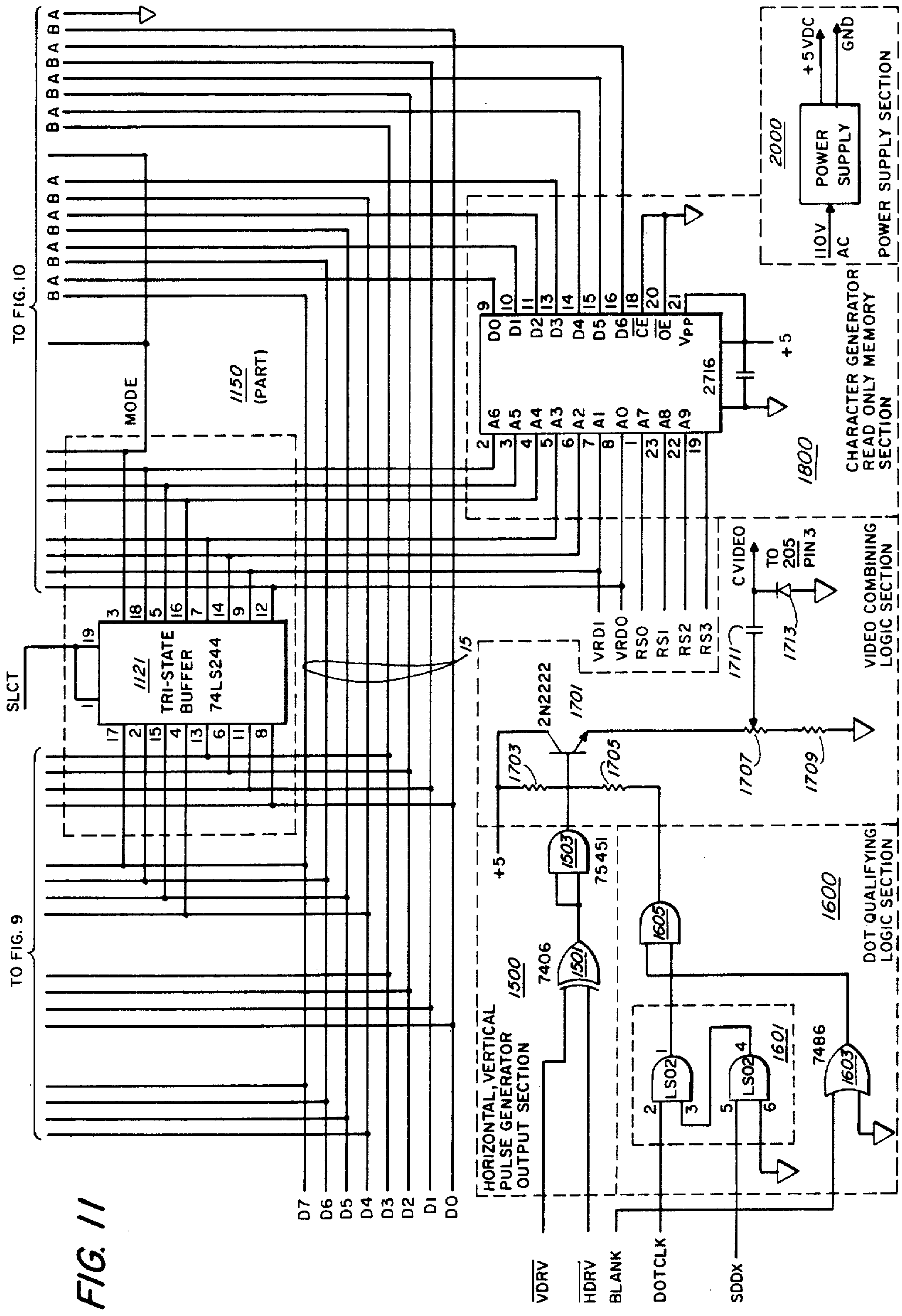
FIG. 11 is a schematic diagram of another part of the video refresh memory section 1150, the horizontal and vertical pulse generator output section 1500, the dot qualifying logic section 1600, the video combining logic section 1700, the character generator read only memory section 1800 and the power supply section 2000 shown in FIG. 2.
Figure 12:
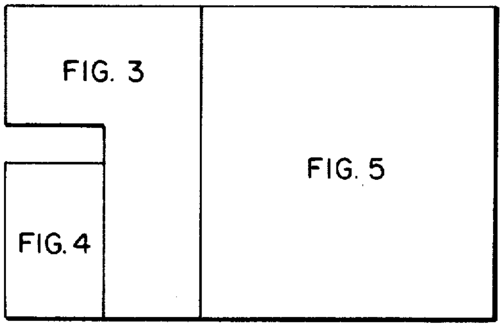
FIG. 12 is a diagram showing how
Figure 13:
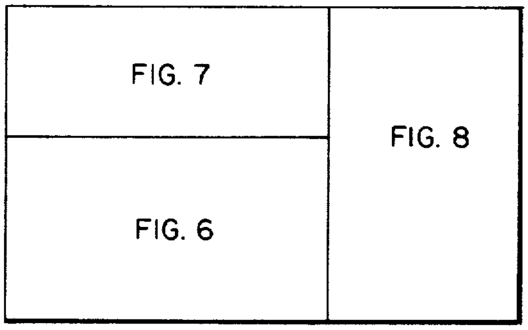
FIG. 13 is a diagram showing how
Figure 14:
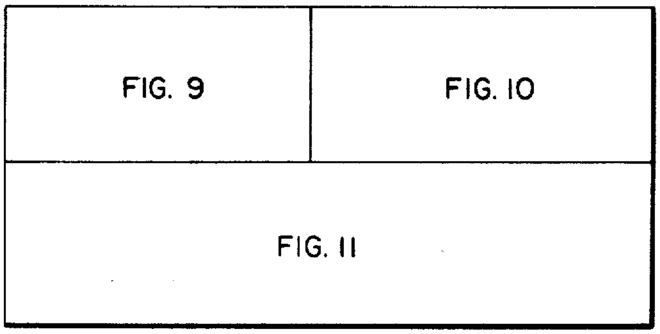
FIG. 14 is a diagram showing how

Referring now to FIG. 2, device 11 includes a system data/address bus 13, an alternate data/address bus 15, a data input and power section 100, a video switching section 200, a processor section 300, a systems clock section 400, a data receiving and monitoring section 500, a system memory section 600, a bus selection section 700, a terminal address/control address selection decoder section 800, a select line gating section 900, a counting logic section 1000 for generating dot clock and horizontal and vertical sync pulses, a video refresh address pointer, selection logic section 1100, a video refresh memory section 1150, a sync combining logic section 1200, an output shift register section 1300, a character generator and graphics databus selector section 1400, a horizontal and vertical pulse generator output section 1500, a dot qualifying logic section 1600, a video combining logic section 1700, a character generator memory section 1800, an address switch section 1900 and a power supply 2000.

Data input and power section 100 receives data and clock signals in serial fashion from modem M and converts the signals so received to TTL levels, receives +5 volts and ground voltages from power supply section 2000 for use in powering device 11 and receives a reset signal from a reset butt on (not shown).

· Video switching section 200 receives analog video signals from terminal electronics section TE of computer terminal CT, receives analog video signals from the video combining logic section 1800 and outputs one or the other of such signals to the CRT electronics section CE.

Processor section 300 controls the overall operations of device 11.

System clock section 400 generates a clock signal which is used in the operation of device 11.

Data receiving section 500 converts the serial stream of data signals received from data input and power section 100 into a parallel stream of data signals.

System memory section 600 includes random access memory chips for temporary storage of the date signals received from data receiving and monitoring section 500 prior and subsequent to any processing and read only memory chips for holding the program for operating device 11.

Bus selection section 700 contains hardware and logic for selectively moving data along and between the various buses in device 11.

Terminal address and control address decoder section 800 generates a switch 1 read signal $\overline{\text{SW1RD}}$ and a switch 2 read signal $\overline{\text{SWZRD}}$ for use in reading the control address and terminal address switches in section 1900.

Select line gate section 900 qualifies a select signal $\overline{\text{SLCT}}$ used in the operation of adapter 11.

Counting logic section 1000 generates dot clock and horizontal and vertical sync pulses used in the operation of adapter 11.

Video refresh memory section 1150 temporarily stores in one set of RAMS data signals corresponding to images and in another set of RAMS ASCII code signals representative of characters.

Video refresh address pointer selection logic section 1100 contains logic elements for use with video refresh memory section 1100.

Sync combining logic section 1200 generates a blanking signal BLANK.

Output shift register section 1300 converts parallel data signals received from character generator/graphics data bus selector section 1400 into series data signals SDDX.

Character generator/graphics data bus selector section 1400 selects either parallel data signals corresponding to images from video refresh memory section 1100 or parallel data signals corresponding to characters from character generator read only memory section 1800 and transmits the parallel signal selected to output shift register section 1300.

Horizontal and vertical output section 1500, dot qualifying logic section 1600 and video combining logic section 1700 collectively process a vertical drive signal VRRB, a horizontal drive signal $\overline{\text{HDRV}}$, a blanking signal BLANK, a dot clock signal DOTCLK and a data signal SDDX to produce an anlog video signal CVIDEO which is applied to video switching section 200.

Character generator read only memory section 1800 stores bit patterns corresponding to characters represented by the ASCII code signals.

Address switch section 1900 holds the terminal address and the control address.

Power supply unit section 2000 generates +5 volts and ground signals from a 110 volt AC source for use in powering device 11.

Data input and power section 100 includes a connector 101, a buffer 103, a buffer 105 and a capacitor 107. Video switching section 200 includes a first connector 210, a second connector 203, a switch 205, a relay 207, a diode 209, a transistor 211 and a pair of resistors 213, and 215.

Processor section 300 includes a microprocessor 301, a resistor network 303, a latch 305, a decoder 307, a gate 309, an inverter 311, an LED 313, an RC circuit 315, an LED 317, a resistor 319, a resistor 321, an inverter 323, a gate 325, an inverter 327 and set of decoders 329. System clock section 400 includes an oscillator 401 and a pair of inverters 403 and 405.

Data receiving and monitoring section 500 includes a USART 501, a pair of dividers 503 and 505, a pair of inverters 507 and 509 and a set of jumper connections 511. System memory section 600 includes a set of four RAMS 601, 603, 605, and 607, a pair of EPROMS 609 and 611, a set of of three gates 613, 615, 617 and a decoder 619 having four gates 619-1, 619-2, 619-3 and 619-4.

Bus selection section 700 includes an inverter 701 a pair of gates 703 and 705, a pair of switches 707 and 709, a pair of resistor networks 711 and 713, and five tri-state buffers 715, 717, 719 and 721 and 723. Terminal address/control address selection decoder section 800 includes a pair of inverters 801 and 803 and a decoder 805.

Select line section 900 comprises a single flip-flop 901.

Counting logic section 1000 includes three counters 1001, 1003 and 1005, two asynchronous counters 1007 and 1009, a pair of flip-flops 1013 and 1015, a set of three flip-flops 1017, 1019 and 1021, a resistor 1023, three inverters 1025, 1027 and 1029 and four gates 1031, 1033, 1035 and 1037 and 1039. Video refresh address pointer selection section 1100 includes five selectors 1101, 1102, 1103, 1105 and 1107. Video refresh memory section 1150 includes six random access memorys 1109, 1111, 1113, 1115, 1117 and 1119 and a tri state buffer 1121.

Sync combining logic section 1200 includes a flip-flop 1201, a gate 1203 and a resistor 1205. Output shift register section 1300 includes a flip-flop 1301, a gate 1303 and a parallel to serial converter 1305.

Character generator/graphics data bus selector section 1400 includes two bus selectors 1401 and 1403. Horizontal and vertical pulse generator output section 1500 comprises a gate 1501 and a buffer 1503. Dot qualifying logic section 1600 includes a gating circuit 1601, a gate 1603 and a buffer 1605. Video combining logic section 1700 includes a transistor 1701, resistor 1703, 1705, 1707 and 1709, a capacitor 1711 and a diode 1713. Character generator memory section 1800 includes an EPROM 1801. Address switch section 1900 includes two switches SW1 and SW2. Power supply section 2000 includes a power supply unit 2001.

Referring now to the individual sections, and first to data input and power section 100, connector 101 is a five pin input connector. Connector 101 receives a reset signal (from a reset button, not shown) over pin 1, receives data and clock signals in serial form (from an external source, such as a modem) over pins 2 and 5, respectively, and receives Vcc and ground signals from power supply 1900 over pins 3 and 4, respectively. Buffer 103 buffers the +12 and −12 RS232 levels of the clock signals received at pin 13 from pin 5 of connector 101, changes them to TTL level signals and outputs a signal $\overline{\text{EXTCLK}}$ over pin 11. Buffer 105 buffers the +12 and −12 data signals received at pin 2 from pin 2 of connector 101, changes them to TTL level signals and outputs an RxIN signal from pin 3.

Referring now to section 200, connector 201 is an input connector that accepts analog video output signals from the terminal electronics section TE of the terminal T and connector 203 is an output connector that allows analog video signals to flow out from device 11 to the CRT electronics section CE of the terminal T. Switch 205 is a fail-safe switch. When device 11 is operating normally, switch 205 is in the "normal" position. When placed in a fail-safe mode, operation of device 11 is disabled so that device 11 cannot switch between internally generated video signals and those supplied from terminal electronics section TE. Relay 207 is a solid state relay that switches between video signals coming from video combining logic section 1800 over pin 3 on switch 205 and video signals coming from the control electronics section CE of the terminal through connector 201 depending on whether coil 207-1 is energized. The input signal is received over either pin 7 or pin 14 of switch 207 and the output signal is transmitted out over pin 1 of switch 207. Transistor 211 is a switching transistor that allows current to flow between +5 volts and ground through coil 207-1. Diode 209 limits the flow of current between coil 207-1 of relay 207 and the collector of transistor 211. Resistor 213 protects the amount of current flowing to the base of transistor 211 and resistor 215 limits the amount of current flowing to the base of transistor 211.

Referring now to section 300, microprocessor 301 is a microprocessor that executes the program that controls the overall operation of device 11. Inverter 311 receives inputs from pin 4 of microprocessor 301 and produces a buffered signal that is used to light LED 313, indicating that device 11 is processing image data. As can be seen, microprocessor 301 includes an address bus and a data bus which are multiplexed together over pins 12 through 19 from AD0 through AD7. The multiplexed lines are demultiplexed by latch 305. Latch 305 demultiplexes the address and data such that the data goes out on lines D0 through D7 (i.e. lines 329) and the address goes out of lines A0 through A7 (i.e. lines 331). The address bus and the data bus are pulled up by a resistor network 303 such that when they are subsequently tristated, as will hereinafter be described, will become "1"s. Resistor 319 serves as a limiting resistor which limits the flow of current through LED317 which is the "power-on" light for device 11. RC network 315 receives a signal from pin 1 of connector 101 and generates a reset pulse which is applied to microprocessor 301 over line 36. Buffer 323 is used to change the signal level of IO/M from pin 35 of microprocessor 301 from a high to a low. The buffered signal from pin 4 of buffer 323 is applied to gate 325 and decoders 329.

Decoders 329 decode logic for IO read, $\overline{\text{IORD}}$, IO write $\overline{\text{IOWR}}$, memory read, $\overline{\text{MRD}}$, and memory write, $\overline{\text{MWR}}$, signals which are used later on in the circuitry. Decoders 329 receive inputs from lines 34, 32 and 31 of microprocessor 301 over lines 1, 2, 5, 4, 12, 13, 10 and 9 and output the above noted four signals over pins 3, 6, 11 and 8, respectively. Decoders 307 decodes "chip selects" from memory locations that are active later on in the circuitry. Decoder 307 receives address lines A10 through A15 over pins 18 through 23 and outputs signals C52, C53, C54 and A10 through A13. The select line SLCT is decoded between an address line and also decoded on the memory cycle of the processor by means of gate 325. Gate 309 is used to generate a signal C54.

Referring now to the system memory section 600, RAMS 601, 603, 605 and 607 are used for storing, stacking and manipulation of data. They receive their data from data lines D0 through D7 of system data/address bus 13, which at this point is simply the data bus from processor 301 and have address lines which decode A0 through A9 for specific memory locations. The memory write $\overline{\text{MWR}}$ and memory read $\overline{\text{MRD}}$ signals which are applied to RAMS 601, 603, 605 and 607 are decoded by gates 613, 615 and 617. These gates qualify the chip selects and the memory read and memory write circuits such that the timing is correct for reading and writing into RAMS 601, 603, 605 and 607. EPROMS 609 and 611 contain the program of the overall operation of the device 11. They each receive data signals from bus 13 over pins 9 through 17 and address lines A0 through A9 over pins 1 through 8, 22 and 23. The chip selects CE for EPROMS 609 and 611 which are applied to pins 18 of EPROMS 609 and 611 are qualified by gates 619 through 619-4 in decoder 619. Tristate buffer 721 is coupled directly to data lines D0 through D7 of system data/address bus 13 which is connected to processor 301. As data moves through tristate buffer 721 it becomes a separate data bus 722 which may or may not be active in the video refresh system, depending on the status of tristate buffer 721 system so that only one set of address lines can activate the line.

Gates 710, 703 and 705 are used to qualify the select bus $\overline{\text{SLCT}}$. Gate 701 is an inverter which changes the select line $\overline{\text{SLCT}}$ to deselect DESLCT. Gate 703 receives the select line $\overline{\text{SLCT}}$ at pin 9 and the memory write line $\overline{\text{MWR}}$ at pin 8 and along with gate 705 produces a signal line video write $\overline{\text{VIDWR}}$. The $\overline{\text{VIDWR}}$ line is used to unlock the data tristate buffer 721 while the $\overline{\text{SLCT}}$ line is used to unlock the address tristate buffers 719-1 and 719-2.

Decoder 619 qualifies the address to be at zero. It generates a chip select "1" when all of address lines A11 through A15 are at zero, which then qualifies EPROM 609 which resides at zero. The addressing portion of the main bus is tristated by tristate buffers 719-1 and 719-2 and becomes a separate address bus 710 which may or may not be active in the video refresh section, depending on the status of tristate buffers 719-1 and 719-2. In effect, what is happening is that the video section is getting addresses that are generated concurrently by oscillator section and are stepped through in a one after another fashion. There are times, however, when the processor 301 wishes to write to a specific memory location in the video system and when this occurs it will unlock the tristate buffers from the main address bus and lock the tristate buffers into a bus on the alternate data bus 15.

Referring now to bus selector section 700 (part 1) and address switch section 2000, switches SW1 and SW2 contain the address of the particular terminal to which device 11 is connected. Tri-state buffers 715 and 717 allow the address contained in SW1 and SW2 to be placed on bus 13. Switches SW1 and SW2 are pulled normally high by means of resistor networks 711 and 713. Thus, for example, when switch SW1 is closed, the set of lines 715-1 connected thereto will go to ground and become 0's. Tristate buffer 715 receives a switch 1 read $\overline{\text{SWIRD}}$ signal from decoder 805. When the signal is received, buffer 715 is enabled, allowing the data residing on switches 707 and 709 to be placed on bus 13. After the data is placed on the data bus buffer 715 is disabled.

Referring now to data receiving/monitoring section 500, USART 501 is a universal synchronous asynchronous receiver that receives data signals in serial fashion over pin 3 from pin 3 of connector 101 of data input and power section 100 and outputs the signals in parallel fashion i.e. D0 through D7, onto bus 13 from pins 1,2,5,6,7,8,27 and 28. USART 501 has two operating modes, namely, a command mode and a data mode which are controlled through pin 12 and which are decoded by decoding the address lines on A0 or A1. Data is received synchronously by taking in the clock signal from the external clock i.e. from pin 5 of connector 101 or asynchronously by taking a clock signal from either counter 503 or counter 505. Counter 503 receives a 6.144 MHZ signal from oscillator 401 in oscillator section 400 and outputs 614.4 KHZ signal over pin 11. Counter 505 receives the 614.4 KHZ signal from counter 503 and outputs a 307.2 KHZ over pin 11. The particular clock signal applied to USART 501 is jumper selectable by jumper 511.

Referring now to section 900, flip flop 901 is a J-K flip flow that qualifies the select line SCLT such that processor 300 is not selecting video refresh during processor active cycles. Thus, the screen of the CRT is stable (does not have any flashes) during the time the processor 300 is active.

Referring now to system clock section 400, oscillator 401 is a 6.144 HHZ oscillator that supplies clocking signals to processor 300, USART 501 and counting logic section 1000. The clocking signal sent to processor 301 and USART 501 is first passed through inverter 403 which changes its state and the clocking signal applied to counting logic section 1000 is first passed through inverter 405. The output of inverter 405 at pin 4 is the dot clock for the video system of device 11.

Referring now to bus selection hardware section 700, tristate buffer 723 activates and deactivates the lines that select or deselect the lines in the character generator section 1400. Tristate buffer 723 receives inputs A0, A1, A2 and A3 from data bus 13 and outputs signals VA0, VA1, VA2 and VA3.

Referring now to section 1000, counters 1001, 1003 and 1005 are counters which receive an input signal from the dot clock i.e. from pin 4 of buffer 405, and divide the dot clock signal down to the appropriate frequencies needed to generate horizontal sync and vertical sync signals. The clock signal is received at each counter over pin 2 and the appropriate output signal is outputted over pin 9. Gate 1037 is a gate that serves as a qualifier for the counters 1001, 1003 and 1005. Counter 1007 is an asynchronous counter that is used to derive eventually the vertical sync pulse which appears at the output of flip-flop 1019 at pin 5. Flip-flop 1013 and 1015 are flip-flop which are used to generate horizontal blanking signals. Flip-flops 1017 and 1019 includes a divide circuit which is used to generate vertical blanking signals.

Referring now to video refresh/address pointer selection section 1100, and video refresh memory section 1150, selector 1101 is a selector that is used to input a series of address lines to counters 1102, 1103, 1105 and 1107. Counter 1101 receives and decodes signals from address lines A10 and A11 and decodes signals received from the data bus called VRD0 and VRD1. These signals are hardware generated by the video refresh address pointer selection logic section 1100 to determine what position the graphics data is to be placed into. Counters 1102, 1103, 1105 and 1107 enable the video refresh system to run by itself without requiring processor assistance to continually output graphic data. The output data from counters 1102, 1103, 1105 and 1107 are fed into memory chips 1109, 1111, 1113 and 1115 which and are decoded memory locations in those chips. These chips contain the high density graphics data and receive inputs from address lines A0 through A10. Memories 1117 and 1119 contain the normal video refresh memory (i.e. ASCII code signals representative of characters). Thus, these are two video refresh sources of memory, namely RAMS 1109, 111, 1113 and 1115 or RAMS 1117 and 1119.

Turning now to character generator bus selector section 1400, bus selectors 1401 and 1403 are used to select the particular source of data. They can either receive data signals from character generator 1801 or from RAMS 1109, 1111, 1113 and 1115.

Referring now to the character generator section 1800, character generator 1801 is an EPROM which, when it receives an ASCII code signal from RAMS 1117 or 1119 generates a bit pattern and an $8\times16$ envelope that corresponds to the letter or number represented by the ASCII code.

The output of selectors 1400 is fed into output shift register section 1300. Chip 1301 in section 1300 is a parallel to serial converter that takes in parallel data in and shifts it out serially depending on the load clock it receives, from pin 6 of flip-flop 1301. Dot line data is then outputted on pin 13 of parallel to serial converter 1305.

Buffer 1121 in video refresh memory section 1150 is a tristate buffer that allows only the output of RAMS 1117 and 1119 or Rams 1109, 1113, 1115 and 1117 to be active at any one time on the data bus. What controls this arbitration is the line select signal $\overline{\text{SLCT}}$.

Turning now to section 1600, chip 1601 is a pair of gates that qualify serial output data SDDX and dot clock DOTCLK signals such that the dots are outputted at the proper time. Buffer 1609 allows the output signal from chip 1601 to be qualified with blanking signals which are passed through buffer 1603. The output buffer 1605 at pin 3 appears on the base of transistor 1701. The signal strength of the output of transistor 1701 is controlled by resistor 1705, 1709, 1707 and capacitor 1711.

Device 11, when connected to computer terminal T, operates in the following manner.

First, assume switch 205 is in a fail-safe position, relay 207 is not energized and the terminal electronics section TE of computer terminal T is outputting (analog) video signals (corresponding to dot patterns of characters). The video signals will output from port PB of terminal electronics section TE, travel along line 12-2 and enter device 11 through video-in connector 201. The signals will then travel along line 202, by-pass switch 205, and enter relay 207 through pin 14. The signals will leave relay 207 through pin 1 and pass through line 208 to video-out connector 203 which is connected through line 12-3 to port PC in CRT electronics section CE of computer terminal T. If, for some reason, relay 207 becomes energized, then the video signals traveling along line 202 will enter switch 205 through pin 1, leave switch 205 through pin 2, enter relay 207 through pin 7 (instead of pin 14) and still leave relay 207 through pin 1. Thus, video signals from computer terminal T will always travel from video in connector 201 to video-out connector 203 depending on whether relay 207 is energized.

On the other hand, when switch 205 is in a normal position the video signals outputted from pin 1 of relay 207 will be either signals from video input connector 201/entering relay 207 through pin 14, if relay 207 is not energized, or video signals generated internally by device 11 (from external data signals) and entering switch 205 through pin 3, leaving switch 205 through pin 2 and then entering relay 207 through pin 7, if relay 207 is energized. The energization of relay 207 is controlled by microprocessor 301.

Serial data from an external source, such as modem M, enters device 11 through pin 2 of connector 101. The data signals are either representative of text or data. The accompanying clock signals enter device 11 through pin 5 of connector 101. At the same time, the serial data signals enter computer terminal T at port PB. If the data signal are for text they are processed by terminal electronics section TE and ignored by device 11. On the other hand, if the data signal are for graphics or for graphics along with text then they are processed solely by device 11.

The data received at pin 2 of connector 101 is buffered by buffer 105 and transmitted over line RxIN to pin 3 of USART 501. USART 501 is capable of operating in either a synchronous, an asynchronous or an SDLC protocol. The particular protocol employed is controlled by the software in EPROMS 609 and 611. The clock signals from pin 5 of connector 101 are buffered by buffer 103 to produce a signal external clock $\overline{EXTCLK}$ which is applied to pin E of jumper set 511.

Data entering pin 3 of USART 501 generates an interrupt signal RxRDY. The interrupt signal RXRDY which appears at USART 501 over pin 14 as a signal RST 7.5 is applied to pin 7 of microprocessor 301. Interrupt signal RST 7.5 causes microprocessor 301 to go to a specific memory location in EPROM 609. That specific memory location tells the microprocessor 301 to match the characters coming into the device 11 against the unique terminal address and control unit address which have been assigned to device 11 by switches SW1 and SW2 to determine if the data is for that computer terminal CT. It should be noted that the switches are actually tied through tri-state buffers 715 and 717 to the system data/address bus 13 and the switch settings are actually fed into a block of memory in RAM 603.

If the microprocessor 301 determines that the data is not for the particular device 11, microprocessor 301 will run through its program which is stored in EPROM 609 and/or EPROM 611 and then come to a halt. It will do nothing until it receives another interrupt signal from USART 510. Thus, microprocessor 301 continuously monitors data received at USART 501 to see if it matches the switch settings on switches SW1 and SW2 and those switch settings ashere to the protocol in EPROMS 609 and 64.

As noted before, USART 510 is able to run either synchronously or asynchronously based on the particular clock signals that are applied to USART 501 at pins 9 and 25 from inverter 509 through pumper 511. Jumper 511 can receive either the external clock signal $\overline{EXTCLK}$ from pin 5 of connector 101 at jumper pin E, a 614.4 KHZ signal from divider 503 at jumper pin B or a 307.2 KHZ signal from divider 505 at jumper pin C. Divide-by circuit 503 receives a 614. MHZ signal from oscillator 401 in system clock section 400 and divide-by circuit 505 receives a 614. KHZ input signal from the output of divide-by circuit 503.

If microprocessor 301 determines that the data coming in from connector 101 is for the particular computer terminal TC to which it is connected and is text data only (i.e. data representative of characters) then microprocessor 301 will ignore the data signals since they are being processed by terminal electronics section TE.

On the other hand, if the data is image quality data (i.e. data signals representative of an image or data signals of text to be displayed simultaneously with graphics, the same process occurs initially. Data coming in from connector 107 is applied to pin 3 of USART 501 and generates an interrupt signal which comes out of USART 501 from pin 14 and comes into microprocessor 301 at pin 7 generating therein an interrupt signal. The interrupt signal causes microprocessor to go to a specific memory location in EPROM 609 containing a program. Microprocessor 301 then begins to execute that program which in effect, causes microprocessor 301 to examine the data to determine it is image quality data. Once it has determined that it is image quality data or text data to be displayed simultaneously with graphics microprocessor 301 moves to the next program stored in EPROM 609.

In executing this second program, microprocessor 301 first strobes data from the system bus 13. The data is obtained from pins 1,2,5,6,7,8,27 and 28 of US ART 501 processed by microprocessor 301 stored temporarily in RAMS 601-607 and then placed on lines D0 through D7 of system data/address bus 13. The processing may include decompressing the data if the data is in a compressed form.

As can be seen, lines D0 through D7 are connected to several components, including tristate buffer 721 at pins 2,4,6,8,11,13,15 and 17. Tristate buffer 721 is also connected at pins 1 and 19 to a video write line $\overline{VIDWR}$. Video write line $\overline{VIDWR}$ is a qualified select line that causes tristate buffer 721 to become active and pass data out through pins 3,5,7,9,12,14,16 and 18 to alternate data/address bus 15. From alternate data/address bus 15 the data is placed in memory locations in RAMS 1109,1111,1113 and 1115 if it is graphics data through pins 11,12,13 and 14 on each one of these RAMS on in RAMS 1117 and 1119 if the data is ASC11 code signals representative of characters. The video write signal $\overline{VIDWR}$ also places a write enable $\overline{WE}$ signal onto each one of RAMS 1109, 1111, 1113,1115,1117 and 1119. The data will get into any one of these RAMS that is write enabled. Data will be written in at the time the RAM chip is selected.

What causes RAMS 1109 through 1119 to be chip selected is a series of clocking logic in the video refresh address pointer selection logic section 1100.

Essentially, the clocking logic starts at the beginning address of each one of RAMS 1109 through 1115 and steps the data through, one chip at a time. Thus RAMS 1109 through 1115 will fill up with graphics data and RAMS 1117 and 1119 will fill up with ASCII code signals (if there are any of such signals).

At the same time, oscillator 401 in system clock section 400 continues to run and continues to supply clocks to counters 1001,1003 and 1005 in counting logic section 1000. The clock pulses from oscillator 401 are first buffered by buffer 405 and are applied over line 406 to pin 2 on each one of the counters, the signal travelling along line 406 constituting the "dot" clock for the entire circuit. Counters 1001 through 1005 supply clock pulses to output shift register section 1300 and causes parallel to serial converter 1305 to clock serial video data out from pin 13 over line 1306 to the video output portion of the system. Parallel to serial converter 1305 obtains the parallel data over pins 2,3,4,5,10,11,12 and 14 from pins 12,9,7 and 4 of bus selectors 1401 and 1403.

Because oscillator 401 is continually running, the output over line 1306 is continually updated and this all occurs while data is being written into RAMS 1109 through 1115. The reason this happens simultaneously is that the data is not yet released to the clocking circuits.

What causes the data to be released from either RAMS 1109 through 1115 or RAMS 1117 and 1119 is the contents of the RAMS 1117 and 1119. More specifically, RAMS 1117 and 1119 are loaded by microprocessor 301, depending on the particular program active in EPROM 609, to contain ASCII code signals which will produce dot patterns of characters and is also loaded with a code signal which does not represent a character but rather serves as a control signal for buffer 1121.

As noted previously, device 11 has the capability to generate its own bit patterns corresponding to characters from ASCII code signals.

What causes the bus selectors 1401 and 1403 to receive either data signals from character generator section 1800 or data signals from RAMS 1109–1115 is the decoding of the mode selection character loaded into RAMS 1117 and 1119.

Thus, bus selectors 1401 and 1403 will either obtain data from RAMS 1109, 1111, 1113 and 1115 on from the character generator section 1800. If bus selectors 1401 and 1403 are active, the data will be moved into parallel to serial converter 1305.

Pin 11 in RAMS 1117 and 1119 is the particular pin which output the signal which controls whether bus selector 1401 and 1403 receive data signals from character generator section 1800 or RAMS 1109, 1111, 1113 and 1115.

If the signal is a mode 1 signal, then the content of RAMS 1109, 1111, 1113 and 1115 will be loaded into bus selectors 1401 and 1403. On the other hand, if the signal is a mode 2 signal then the ASC11 code signals in RAMS 1115 and 1117 will be sent to character generator read only memory 1801 which in turn will unload bit patterns of characters which will be sent to bus selectors 1401 and 1403.

The serial data output signal SDDX and the dot clock signal DOTCLK are fed into dot qualifying log section 1600.

The output of dot qualifying logic section 1600 and the output singal from horizontal and vertical pulse generator section 1500 are fed into video combining logic section 1700. The output signal CVIDEO from video combining logic section 1700 is applied to pin 3 of switch 205. The signal will then enter relay 207 through pin 7 (assuming switch 205 is in the "normal" position) and, if coil 207-1 is engergized will leave relay 207 through pin 1.

As can be appreciated, device 11 may be programmed so that all data signals from line L1 are processed by device 11 rather than merely data signals corresponding to graphics or data signals corresponding to text to be displayed simultaneously with graphics.

The following is the object code in EPROMS 609 and 611 for operating device 11.

```
DDT
DDT VERS 2:2
-D6000,6800
6000 03 00 01 76 76 76 76 76 76 76 76 76 76 76 76 76 ...vvvvvvvvvvvvv
6010 76 76 76 76 76 76 76 76 76 76 76 76 76 76 76 76 vvvvvvvvvvvvvvvv
6020 76 76 76 76 76 76 76 76 76 76 76 76 76 76 76 76 vvvvvvvvvvvvvvvv
6030 76 76 76 76 76 76 76 76 76 76 76 76 C3 20 01 76 vvvvvvvvvvvv. .v
6040 76 76 76 76 76 76 76 76 76 76 76 76 76 76 76 76 vvvvvvvvvvvvvvvv
6050 76 76 76 76 76 76 76 76 76 76 76 76 76 76 76 76 vvvvvvvvvvvvvvvv
6060 76 76 76 76 76 76 76 76 76 76 76 76 76 76 76 76 vvvvvvvvvvvvvvvv
6070 76 76 76 76 76 76 76 76 76 76 76 76 76 76 76 76 vvvvvvvvvvvvvvvv
6080 76 76 76 76 76 76 76 76 76 76 76 76 76 76 76 76 vvvvvvvvvvvvvvvv
6090 76 76 76 76 76 76 76 76 76 76 76 76 76 76 76 76 vvvvvvvvvvvvvvvv
60A0 76 76 76 76 76 76 76 76 76 76 76 76 76 76 76 76 vvvvvvvvvvvvvvvv
60B0 76 76 76 76 76 76 76 76 76 76 76 76 76 76 76 76 vvvvvvvvvvvvvvvv
60C0 76 76 76 76 76 76 76 76 76 76 76 76 76 76 76 76 vvvvvvvvvvvvvvvv
60D0 76 76 76 76 76 76 76 76 76 76 76 76 76 76 76 76 vvvvvvvvvvvvvvvv
60E0 76 76 76 76 76 76 76 76 76 76 76 76 76 76 76 76 vvvvvvvvvvvvvvvv
60F0 76 76 76 76 76 76 76 76 76 76 76 76 76 76 76 76 vvvvvvvvvvvvvvvv
6100 C3 7A 02 49 50 31 30 30 33 2D 30 30 4D 41 52 30 .z IP1003 00MAR0
6110 38 38 33 20 31 39 38 30 20 20 44 49 47 49 54 41 883 1980, DIGITA
6120 E5 F5 DB 09 E6 02 CA 4F 01 DB 08 FE 32 CA 43 01 .......O....2.C.
6130 FE FF CA 39 01 2A 1B 40 E9 3E 94 D3 09 DB 08 DB ...9.*.@.>......
6140 08 DB 08 F1 E1 FB C9 E1 22 1B 40 F1 E1 FB C9 3E ........".@....>
6150 94 D3 09 DB 08 DB 08 DB 08 CD 47 01 CD 47 01 67 ..........G..G.g
6160 3A 02 40 BC C2 5C 01 CD 47 01 67 3A 02 40 BC C2 :.@..\..G.g:.@..
6170 4F 01 CD 47 01 67 3A 03 40 BC C2 4F 01 CD 47 01 O..G.g:.@..O..G.
6180 67 3A 03 40 BC C2 4F 01 CD 47 01 FE 03 CA 4F 01 g:.@..O..G....O.
6190 FE 02 C2 88 01 CD 47 01 FE 38 CA D0 01 FE 03 CA ......G..8......
61A0 4F 01 FE 39 C2 95 01 2A 19 40 23 22 19 40 2A 15 O..9...*.@#".@*.
61B0 40 77 FE 03 CA 14 02 23 7D FE 24 C2 C7 01 7C FE @w.....#}.$...|.
61C0 47 C2 C7 01 21 1D 40 22 15 40 CD 47 01 C3 A7 01 G...!.@".@.G....
61D0 CD 47 01 FE 39 CA A7 01 FE 03 CA A7 01 FE 15 CA .G..9...........
61E0 01 02 FE 0A CA 01 02 CD 11 05 FE BF CA D0 01 2A ...............*
61F0 13 40 FE 0D CA 01 02 FE 0A CA 01 02 77 23 C3 0E .@..........w#..
6200 02 2A 13 40 7D E6 C0 C6 40 6F 7C CE 00 67 22 13 .*.@}...@o|..g".
```

```
6210 40 C3 D0 01 3E 50 D3 09 C3 59 01 3E FF 32 11 40 @...)P...Y.).2.@
6220 21 80 F8 22 13 40 CD 47 01 FE FF CA 26 02 32 04 !..".@.G....&.2.
6230 40 1F 1F 1F 1F E6 0F CD EB 04 2A 13 40 77 23 22 @.........*.@w#"
6240 13 40 3A 04 40 E6 0F CD EB 04 2A 13 40 77 23 22 .@:.@.....*.@w#"
6250 13 40 7D E6 3F FE 24 C2 65 02 7D E6 C0 6F 11 40 .@}.?.$.e.}..o.@
6260 00 19 22 13 40 3A 04 40 FE 03 CA 78 02 3A 11 40 ..".@:.@...x.:.@
6270 3D 32 11 40 B7 C2 26 02 F3 76 F3 31 FF 47 3E 20 =2.@..&..v.1.G)
6280 21 40 F8 01 00 04 CD 7A 04 DB 10 32 00 40 32 02 !@.....z...2.@2.
6290 40 DB 20 32 01 40 32 03 40 47 3A 02 40 B0 CA 93 @. 2.@2.@G:.@...
62A0 04 3E 00 01 FF 0B 21 00 F0 CD 7A 04 3E 20 01 00 .)....!...z.) ..
62B0 02 21 00 FB CD 7A 04 3E 80 01 20 00 21 00 FB CD .!...z.).. .!...
62C0 7A 04 3E 81 21 40 FB CD 7A 04 3E 82 21 80 FB CD z.).!@..z.).!...
62D0 7A 04 3E 83 21 C0 FB CD 7A 04 20 F6 18 E6 FB 30 z.).!...z. ....0
62E0 21 C0 F8 01 10 00 11 03 01 21 1D 40 22 15 40 22 !........!.@".@"
62F0 17 40 AF 32 19 40 32 1A 40 21 5C 01 22 1B 40 21 .@.2.@2.@!\.".@!
6300 80 F8 22 13 40 CD 56 04 21 00 F0 22 0B 40 AF 32 ..".@.V.!..".@.2
6310 0A 40 FB CD 56 03 FE 03 CA 45 03 FE 39 C2 13 03 .@..V....E..9...
6320 CD 56 03 32 0E 40 CD 56 03 32 0F 40 CD 56 03 CD .V.2.@.V.2.@.V..
6330 D7 03 47 E6 40 78 CA 3F 03 CD 8F 03 C3 2C 03 CD ..G.@x.?.....,..
6340 DE 03 C3 2C 03 F3 3E 50 D3 09 20 F6 C0 F6 18 E6 ...,..)P.. .....
6350 FB 30 76 C3 53 03 3A 1A 40 B7 C2 64 03 3A 19 40 .0v.S.:.@..d.:.@
6360 B7 CA 56 03 F3 2A 19 40 2B 22 19 40 FB 2A 17 40 ..V..*.@+".@.*.@
6370 46 23 7D FE 24 C2 81 03 7C FE 47 C2 81 03 21 1D F#}.$...|.G...!.
6380 40 22 17 40 78 FE 03 CA 8B 03 C9 E1 C3 45 03 E6 @".@x........E..
63?? 3F 32 10 40 CD 56 03 CD D7 03 E6 3F 32 11 40 CD ?2.@.V.....?2.@.
63 ? 56 03 CD D7 03 E6 3F 32 12 40 17 17 17 17 17 17 V.....?2.@......
63B0 E6 C0 47 3A 11 40 B0 32 11 40 3A 12 40 1F 1F E6 ..G:.@.2.@:.@...
63C0 0F 32 12 40 3A 10 40 CD DE 03 2A 11 40 2B 22 11 .2.@:.@...*.@+".
63D0 40 7C B5 C2 C4 03 C9 21 0E 40 AE 23 AE C9 E6 3F @|.....!.@.#...?
63E0 47 3A 0A 40 E6 03 07 21 F3 03 5F 16 00 19 5E 23 G:.@...!.. ...^#
63F0 56 EB E9 FB 03 03 04 1B 04 37 04 78 2A 0B 40 77 V........7.x*.@w
6400 C3 46 04 78 0F 0F E6 C0 2A 0B 40 4F 3A 0D 40 B1 .F.x....*.@O:.@.
6410 77 23 78 0F 0F E6 0F 77 C3 46 04 78 07 [illegible] 07 07 w#x....w.F.x....
6420 2A 0B 40 E6 [illegible] [illegible] 3A 0D 40 B1 77 78 0F [illegible] [illegible] 0F *.@..O:.@.wx....
6430 E6 03 23 77 C3 46 04 78 07 07 E6 FC 2A 0B 40 4F ..#w.F.x....*.@O
6440 3A 0D 40 B1 77 23 22 0B 40 32 0D 40 3A 0A 40 3C :.@.w#".@2.@:.@<
6450 E6 03 32 0A 40 C9 AF D3 09 D3 09 D3 09 D3 09 D3 ..2.@...........
6460 09 3E 50 D3 09 3E 0C D3 09 3E 32 D3 09 D3 09 3E .)P..)...)2....)
6470 94 D3 09 DB 08 DB 08 DB 08 C9 C5 D5 57 72 23 0B ............Wr#.
6480 78 B1 C2 7D 04 D1 C1 C9 1A 77 13 23 0B 78 B1 C2 x..}.....w.#.x..
6490 88 04 C9 AF D3 09 D3 09 D3 09 D3 09 3E 50 D3 09 ............)P..
64A0 3E 4F D3 09 3E 14 D3 09 20 F6 C0 30 DB 10 1F 1F )O..)... ..0....
64B0 1F 1F E6 0F CD EB 04 32 C8 F8 DB 10 E6 0F CD EB .......2........
64C0 04 32 C9 F8 DB 20 1F 1F 1F 1F E6 0F CD EB 04 32 .2... .........2
64D0 CE F8 DB 20 E6 0F CD EB 04 32 CF F8 DB 09 E6 02 ... .....2......
64E0 CA E8 04 DB 08 32 D2 F8 C3 AC 04 47 DE 0A F2 F5 .....2.....G....
64F0 04 78 F6 30 C9 C6 41 C9 F5 1F 1F 1F 1F E6 0F CD .x.0..A.........
6500 EB 04 32 C8 F8 F1 F5 E6 0F CD EB 04 32 C9 F8 F3 ..2.........2...
6510 76 E5 21 00 07 5F AF 57 19 7E E1 C9 0E 20 CD 15 v.!.._.W.~... ..
6520 00 C3 15 00 CD 03 03 E6 06 FE 06 C2 BE 02 0E 53 ...............S
6530 CD 15 00 0E 50 C3 15 00 CD 2E 00 2A 0C 00 7C CD ....P......*..|.
6540 D5 02 7D CD D5 02 0E 20 CD 15 00 CD 15 00 C9 21 ..}.... .......!
6550 00 00 39 22 13 00 3A 10 00 B7 CA 71 03 21 FF FF ..9"..:....q.!..
6560 22 0E 00 3C C2 71 03 3C 32 10 00 2A 0C 00 C3 97 "..<.q.<2..*....
6570 03 CD 9E 06 C2 40 05 21 10 00 7E B7 CA 83 03 35 .....@.!..~....5
6580 CA 40 05 2A 0C 00 CD A1 06 CD 2E 00 0E 20 CD 15 .@.*......... ..
6590 00 CD 15 00 CD 3B 03 CD A3 02 57 21 45 05 01 11 .....;....W!E...
65A0 00 BE CA FD 04 23 0D C2 A1 03 0E 0A BE CA E9 04 .....#..........
65B0 23 0D C2 AC 03 0E 06 BE CA CE 04 23 0D C2 B7 03 #..........#....
65C0 E6 C0 FE 40 CA B4 04 FE 80 CA A5 04 7A E6 C7 D6 ...@........z...
65D0 04 CA 96 04 3D CA 90 04 3D CA 7C 04 7A E6 C0 CA ....=...=.|.z...
65E0 4A 04 7A E6 07 CA 3F 04 D6 02 CA 34 04 D6 02 CA J.z...?....4....
65F0 29 04 D6 03 CA 1A 04 7A E6 08 C2 0B 05 7A E6 07 )......z.....z..
```

```
6600 4F 3D 21 39 06 09 CD F3 02 CD 03 03 FE 06 C2 9F O=!9............
6610 04 21 36 06 CD F3 02 C3 71 03 21 32 06 CD F3 02 .!6.....q.!2....
6620 CD 03 03 CD D5 02 C3 71 03 0E 43 CD 15 00 CD 0A .......q..C.....
6630 03 C3 D9 04 0E 4A CD 15 00 CD 0A 03 C3 D9 04 0E .....J..........
6640 52 CD 15 00 CD 0A 03 C3 71 03 21 1A 06 7A E6 07 R.......q.!..z..
6650 CA 0B 05 7A E6 0F 3D CA 6E 04 FE 03 DA 61 04 D6 ...z..=.n....a..
6660 05 87 87 4F 09 CD F3 02 CD 24 03 C3 71 03 CD F3 ...O.....$..q...
6670 02 CD 24 03 0E 2C CD 15 00 C3 D9 04 21 16 06 CD ..$..,......!...
6680 F3 02 CD 03 03 CD BE 02 0E 2C CD 15 00 C3 F4 04 .........,......
6690 21 12 06 C3 99 04 21 0E 06 CD F3 02 CD 03 03 CD !.....!.........
66A0 BE 02 C3 71 03 7A E6 38 0F 4F 21 EE 05 09 CD F3 ...q.z.8.O!.....
66B0 02 C3 C5 04 21 EA 05 CD F3 02 CD 03 03 CD BE 02 ....!...........
66C0 0E 2C CD 15 00 7A E6 07 CD BE 02 C3 71 03 79 87 .,...z......q.y.
66D0 87 4F 21 CE 05 09 CD F3 02 CD A3 02 F5 CD A3 02 .O!.............
66E0 57 F1 5F CD 95 06 C3 71 03 79 87 87 4F 21 A6 05 W._....q.y..O!..
66F0 09 CD F3 02 CD A3 02 CD 92 06 C3 71 03 79 87 87 ............q.y..
6700 20 01 02 03 BF 09 BF 7F BF BF BF 0B 0C 0D 0E 0F  ...............
6710 10 11 12 13 BF BF 08 BF 18 19 BF BF BF BF BF BF ................
6720 BF BF 1C BF BF 0A 17 1B BF BF BF BF BF 05 06 07 ................
6730 BF BF 16 BF BF 1E BF 04 BF BF BF BF 14 15 BF 1A ................
6740 20 BF BF BF BF BF BF BF BF BF 60 2E 3C 28 2B BF  .........`.<(+.
6750 26 BF BF BF BF BF BF BF BF BF 21 24 2A 29 3B 5E &.........!$*);^
6760 2D 2F BF BF BF BF BF BF BF BF 7C 2C 25 5F 3E 3F -/........|,%_>?
6770 BF BF BF BF BF BF BF BF BF 5C 3A 23 40 27 3D 22 .........\:#@'="
6780 BF 61 62 63 64 65 66 67 68 69 BF BF BF BF BF BF .abcdefghi......
6790 BF 6A 6B 6C 6D 6E 6F 70 71 72 BF BF BF BF BF BF .jklmnopqr......
67A0 BF 7E 73 74 75 76 77 78 79 7A BF BF BF BF BF BF .~stuvwxyz......
67B0 BF BF BF BF BF BF BF BF BF BF BF BF BF BF BF 04 ................
67C0 7B 41 42 43 44 45 46 47 48 49 BF BF BF BF BF BF {ABCDEFGHI......
67D0 7D 4A 4B 4C 4D 4E 4F 50 51 52 BF BF BF BF BF BF }JKLMNOPQR......
67E0 5C BF 53 54 55 56 57 58 59 5A BF BF BF BF BF BF \.STUVWXYZ......
67F0 30 31 32 33 34 35 36 37 38 39 BF BF BF BF BF BF 0123456789......
6800 52 R
```

What is claimed is:

1. A device for enabling a text type computer terminal to display graphics in addition to text, said computer terminal including a terminal electronics section having a data input port for receiving serial data signals from an external source and a video output port and a CRT electronics section having a video input port, said device comprising:

a. data input means for receiving serial data signals from an external source, b. video input means for receiving video signals from the video output port of the terminal electronics section, c. video output means for applying video signals to the video input port of the CRT electronics section, d. a data processing system coupled to the data input means for processing data signals corresponding at least to graphics and generating therefrom video signals representative of the dot pattern represented by said data signals, and e. means for applying either video signals from the video input means or video signals from the data processing system to the video output means.

2. The device of claim 1 and wherein the data processing system includes:

a. a system bus, b. a serial-to-parallel converter coupled to the output of the data input means and to said system bus for converting the serial data signls from said data input means to parallel data signls and transmitting said parallel data signals to said system bus, c. a processor coupled to said system bus for controlling the overall operations of the data processing system, d. a system memory section coupled to said system bus for temporary storage of said parallel data signals prior to and subsequent to processing by said processor and for storing instructions for the processor, e. a video refresh memory section coupled to said system bus and including RAMS for storing data signals processed by said processor corresponding to dot patterns of graphics, and f. logic means coupled to said video refresh memory section and said video output means for generating from said data signls stored in said video refresh memory section video signals corresponding to the dot patterns represented thereby and transmitting said video signals to the video output means.

3. The device of claim 2 and wherein said device is capable of also processsing data signals corresponding to text and wherein video refresh memory section also includes RAMS for storing ASCII code signals corresponding to text and said device further includes character generator means coupled to said video refresh memory section for receiving ASC11 code signals stored in said RAMS and generating therefrom data signals corresponding to dot patterns of characters.

4. The device of claim 3 and further including means for selectively applying either the data signals in said RAMS corresponding to graphics or the output of the character generator means to the logic means.

5. The device of claim 4 and wherein the means for applying either the video signals from the video input means or video signals from the data processing system to the video output means comprises a relay coupled to said video input means, said video output means and said logic means.

6. The device of claim 5 and further including a fail safe switch coupled between the video input means, the video signals from the data processing system and the relay to insure that video signals from the video input means will pass to the video output means regardless of the status of the relay.

7. A device for enabling a computer terminal equipped to receive serial data signals from an external source and display the information represented thereby only if said information is text to also display the information represented thereby if said information is graphics, said computer terminal including a terminal electronics section having an RS 232 port for use in connecting said computer terminal to said external source and a video output port and a CRT electronics section having a video input port, said device comprising:

a. a system bus, b. a data receiving section coupled to said system bus for receiving serial data from said external source and converting said serial data so received into parallel data, c. a microprocessor coupled to said system bus for controlling the overall operations of said device, d. a system memory section coupled to said system bus and including RAMS for temporary storage of processed and unprocessed data and ROMS for storing program instructions, e. a video refresh memory section coupled to said system bus and including RAMS for temporary storage of bit patterns corresponding to images and ASCII code signals representative of characters, f. a parallel to serial converter coupled to the output of the video refresh memory section for converting the data stored in the video refresh memory section into serial data, g. logic means coupled to the output of the parallel serial converter for producing analog video signals from the output of the parallel to serial converter, and h. means for connecting the output of the logic means to the input port of the CRT section of the computer terminal.

8. A device for enabling a text-only type computer terminal to display graphics or graphics and text simultaneously in addition to text, said comptuer terminal having a terminal electronics section and a CRT electronics section, said terminal electronics section having a data input, a keyboard and video output and said CRT electronics section having a video input and a display screen said device comprising:

a. a system bus, b. first input connector means for receiving serial data and clock signals from an external source and power signals, c. data received means coupled to the output of said first input connector means and said systems bus for converting serial data signals received by the first input connector means into parallel data signals, and transmitting said parallel data signals to said system bus, d. processor means coupled to said system bus for controlling the overall operations of the device, e. system memory means coupled to said system bus for temporary storage of data prior and subsequent to processing by said processor means and storage of instructions for the processor means, f. video refresh memory means coupled to said system bus for temporary storage of data signals corresponding to image patterns and temporary storage of ASCII code signals corresponding to characters, g. character generator means coupled to said video refresh memory means for generating bit patterns corresponding to ASCII characters, h. system clock means for generating clock signals for operating said device, i. logic means coupled to said system clock means for generating dot clock and horizontal and vertical sync pulses, j. output shift register means coupled to the character generator means for converting parallel data signals from the character generator means into series data signals, k. selector means for supplying signals from either the video refresh memory means corresponding to image patterns or from the character generator means to the shift register means, l. logic means coupled to the output of the shift register means for processing the output of the shift register means with the dot clock and vertical and horizontal sync pulses to produce an internally generated video output signal, and m. output connector means coupled to the logic means for connecting the device to the video input of the CRT section of the control terminal.

9. A computer terminal station comprising:

a. a text type computer terminal, said computer terminal comprising a terminal electronics section and a CRT electronics section, said terminal electronics section being constructed to process data signals corresponding to text only and generating video signals representative of the characters of the text, said terminal electronics section having an RS 232 port for use in connecting the computer terminal to an external source of data signals and a video output port, said CRT electronics section including a video input port and a display screen, and b. a converter device coupled to said computer terminal for enabling said computer terminal to also be used for displaying graphics or graphics and text simultaneously said converter device comprising, a first input port for receving data signals from an external source corresponding to graphics or graphics and text, a second input port connected to the video output port of the terminal electronics section a first output port connected to the video input port of the CRT electronics section and a data processing system for processing data signals representative of graphics or graphics and text and generating video signals representative of the dot pattern represented by said data signals.

10. The computer terminal station of claim 9 and wherein said data processing system in said converter device includes a microprocessor controlled relay for applying either video signals received from said second input port or video signals produced by said data processing system to the first output port of said converter device.

11. The computer terminal station of claim 10 and further including a fail safe switch coupled between said second input port, and the data processing system and the microprocessor controlled relay to insure that signals from the second input port will pass to the first output port regardless of the status of the microprocessor controlled relay.

* * * * *